United States Patent [19]

High et al.

[11] Patent Number: 5,274,558

[45] Date of Patent: Dec. 28, 1993

[54] APPARATUS FOR DECOUPLING A TORQUE LOOP FROM A SPEED LOOP IN A POWER MANAGEMENT SYSTEM FOR TURBOPROP ENGINES

[75] Inventors: Glen T. High, Phoenix; Larry C. Prevallet, Glendale; Joseph W. Free, Mesa, all of Ariz.

[73] Assignee: Allied-Signal Inc., Morris Township, Morris County, N.J.

[21] Appl. No.: 762,324

[22] Filed: Sep. 18, 1991

[51] Int. Cl.[5] .................... G06F 15/48; B64C 27/57
[52] U.S. Cl. ..................... 364/431.02; 364/431.07; 244/180; 416/27
[58] Field of Search ........ 364/431.02, 431.07; 244/180, 181, 182, 194, 195; 416/33, 27; 60/39.24

[56] References Cited

U.S. PATENT DOCUMENTS

| | | | |
|---|---|---|---|
| 3,908,934 | 9/1975 | Schloeman | 244/182 |
| 3,989,208 | 11/1976 | La7bregts | 244/182 |
| 4,083,518 | 4/1978 | Garrison et al. | 244/17.11 |
| 4,212,444 | 7/1980 | Stephan | 244/182 |
| 4,249,238 | 2/1981 | Spang et al. | 60/39.24 |
| 4,488,851 | 12/1984 | Young | 416/33 |
| 4,564,908 | 1/1986 | Cleford et al. | 244/180 |
| 4,648,797 | 3/1987 | Martin | 416/27 |
| 4,772,180 | 9/1988 | Walker et al. | 416/33 |
| 4,947,334 | 8/1990 | Massey et al. | 364/433 |
| 4,969,098 | 11/1990 | Leising et al. | 364/424.1 |
| 5,001,646 | 3/1991 | Caldwell et al. | 364/434 |
| 5,023,793 | 6/1991 | Schneider et al. | 364/431.02 |

FOREIGN PATENT DOCUMENTS

| | | |
|---|---|---|
| 0253462 | 1/1988 | European Pat. Off. |
| 2151817 | 7/1985 | United Kingdom |

OTHER PUBLICATIONS

PCT Search Report dated Jan. 15, 1993.

*Primary Examiner*—Thomas G. Black
*Assistant Examiner*—Tan Q. Nguyen
*Attorney, Agent, or Firm*—Hugh P. Gortler; James W. McFarland; Robert A. Walsh

[57] ABSTRACT

A torque loop decoupler decouples a torque loop from a speed loop to allow only the speed loop to react to small, rapid changes in engine speed. The torque loop decoupler calculates a compensation signal and adds the compensation signal to a control signal of the torque control loop. The compensation signal keeps the control signal constant during small, rapid changes in engine speed. The compensation signal is calculated as the partial derivative of turbine torque with respect to changes in engine speed multiplied by a signal indicative of small, rapid changes in engine speed.

18 Claims, 2 Drawing Sheets

APPARATUS FOR DECOUPLING A TORQUE LOOP FROM A SPEED LOOP IN A POWER MANAGEMENT SYSTEM FOR TURBOPROP ENGINES

FIELD OF THE INVENTION

The present invention relates in general to power management systems for turbine engines and in particular to a torque loop decoupler for turboprop engines.

BACKGROUND OF THE INVENTION

Historically, turboprop engines have been controlled via two levers in the cockpit. A speed lever adjusts engine speed and a power lever controls engine torque. First, the pilot would adjust the speed lever to obtain the desired engine speed setting. Then, the pilot would adjust engine torque, which is a function of power lever angle. The pilot would "close the loop" on torque by watching a gauge and moving the power lever angle to the desired torque level.

In turboprop engines, the torque and propeller shaft speed loops are coupled very closely. The torque loop adjusts fuel flow or gas generator speed in an attempt to control engine torque. As fuel flow is being adjusted, the engine power-turbine speed is affected. The power-turbine speed governor regulates propeller blade angle to control power-turbine speed. A change in blade angle directly affects engine torque, thereby affecting the torque control loop.

Among the problems associated with controlling the speed and torque loops simultaneously is that the torque and speed loops react simultaneously to sudden changes in engine speed. For example, an external disturbance such as wind shear can cause a small change in engine speed. The propeller governor speed loop immediately reacts to the external disturbance by adjusting propeller blade angle, and the torque loop immediately reacts by changing fuel flow to compensate for the resulting change in torque. Because speed and torque are controlled together, adverse control-action results.

Therefore, it is an object of the present invention to decouple the torque loop from the speed loop in a power management system for turboprop engines.

SUMMARY OF THE INVENTION

The present invention relates to an apparatus which that decouples the torque loop from the speed loop to allow only the speed loop to react to disturbances in engine speed. The apparatus comprises delta speed means, compensating means and modifying means. The delta speed means provides a signal indicative of small, rapid changes in engine speed. In response to the delta speed means, the compensating means generates a compensation signal that varies as a function of the small, rapid changes in engine speed. The modifying means utilizes the compensation signal to a control signal, to which the torque loop. By virtue of the compensation signal, the torque loop does not compensate for small, rapid changes in engine speed.

DETAILED DESCRIPTION OF THE PREFERRED EMBODIMENT

Figure 1:
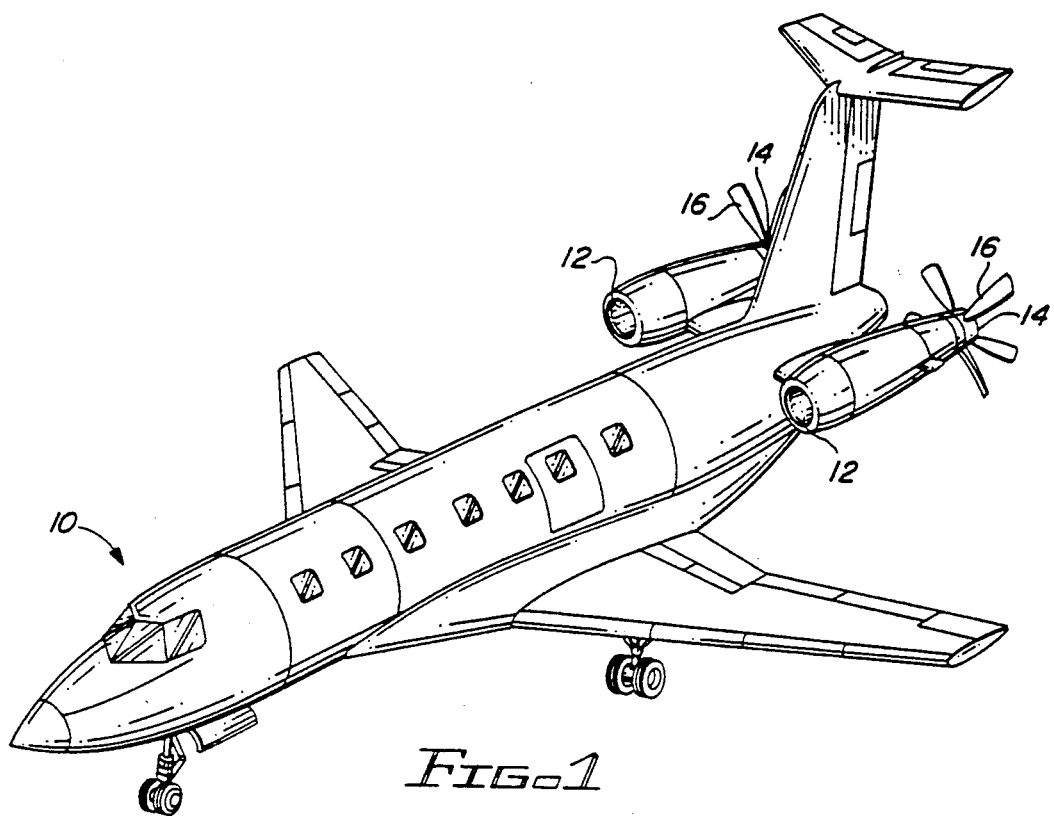
FIG. 1 is a pictorial view of an aircraft that has twin turbo prop engines.

Referring to FIG. 1, there is shown an aircraft 10 having twin turbo prop engines 12. Each engine 12 has a turbine-type power plant that includes a compressor section (not shown), combustion section (not shown) and a turbine section (not shown). These sections are arranged in serial flow relation. A spinner 14 is connected to the aft end of each engine 12. A plurality of propeller blades 16 are circumferentially disposed about the spinner 14 and extend radially therefrom. Air that enters the engines 12 is compressed in the compressor section. The compressed air is discharged to the combustion section, where the air is mixed with fuel. The mixture is ignited to produce hot expanding gases that turn the turbine section, which, in turn, drives the propeller blades 16. The propeller blades 16 move a mass of cold air to create a thrust. The thrust produced by the propeller blades 16 is varied by changing their pitch.

Figure 2:
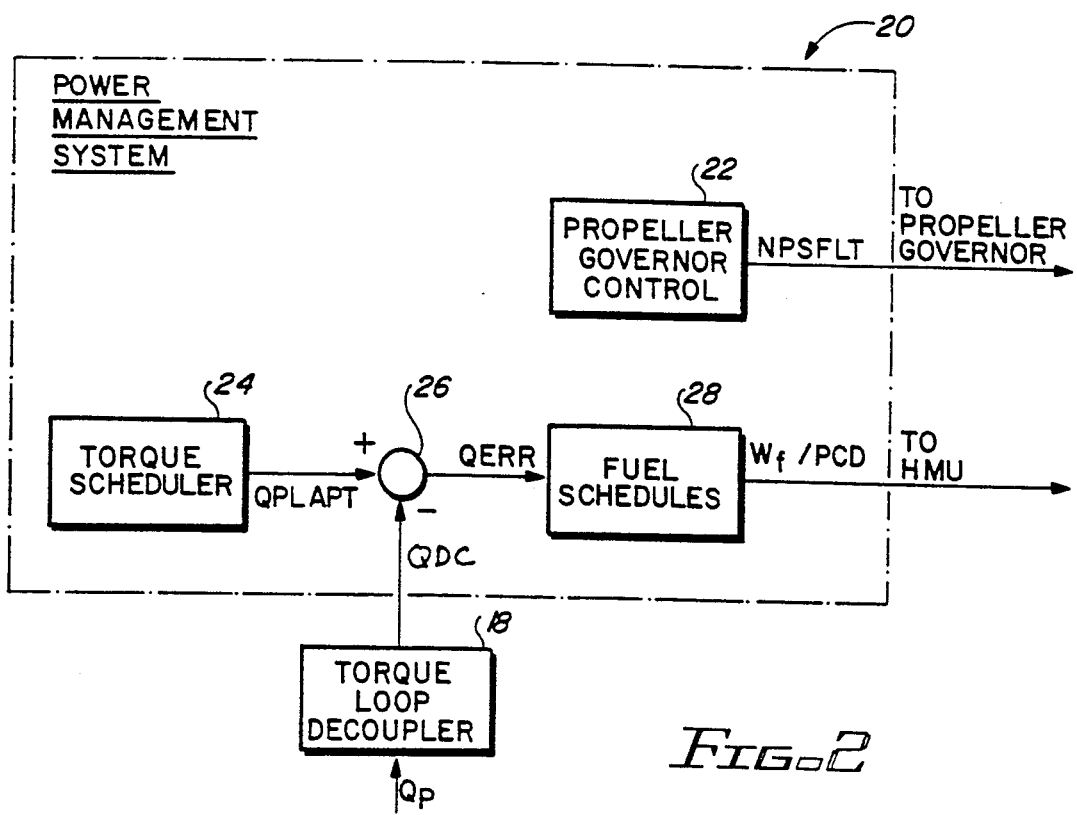
FIG. 2 is a block diagram of a power management system employing a torque loop decoupler according to the present invention.

Referring now to FIG. 2, a torque loop decoupler 18 is employed by a power management system 20 such as the one disclosed in applicants' copending application entitled "POWER MANAGEMENT SYSTEM FOR TURBINE ENGINES", U.S. Ser. No. 07/762,322 filed concurrently herewith. This application is incorporated herein by reference.

This power management system 20 simultaneously controls engine speed and engine torque. It includes propeller governor control logic 22, which provides speed commands NPSFLT to a propeller governor. Through a closed speed loop, the propeller governor changes blade pitch to set engine speed to the commanded speed.

The power management system 20 also includes a torque scheduler 24, which provides torque commands QPLAPT. Torque commands QPLAPT are expressed as a percentage of maximum rated power of the engine.

The torque loop decoupler 18 provides a signal indicating decoupled torque QDC that allows the torque loop to be decoupled from the speed loop and thereby allow only the speed loop to react to sudden changes in engine speed. The signal for decoupled torque QDC is indicative of turbine torque compensated for sudden changes in engine speed.

Through a closed torque loop, the torque scheduler 24 controls fuel flow to set engine power to the commanded power. The difference between the torque command QPLAPT and the signal indicating decoupled torque QDC is taken by a subtracter 26, whose output provides an error signal QERR. This error signal QERR is converted to a ratio of fuel flow to compressor discharge pressure (Wf/PCD) by fuel schedules 28. The ratio (Wf/PCD) is supplied to a hydromechanical metering unit (HMU). Compressor discharge pressure (PCD) is provided by the engine 12. Based upon this ratio (Wf/PCD), the hydromechanical metering unit meters the appropriate fuel flow to the turboprop engine 12.

Figure 3:
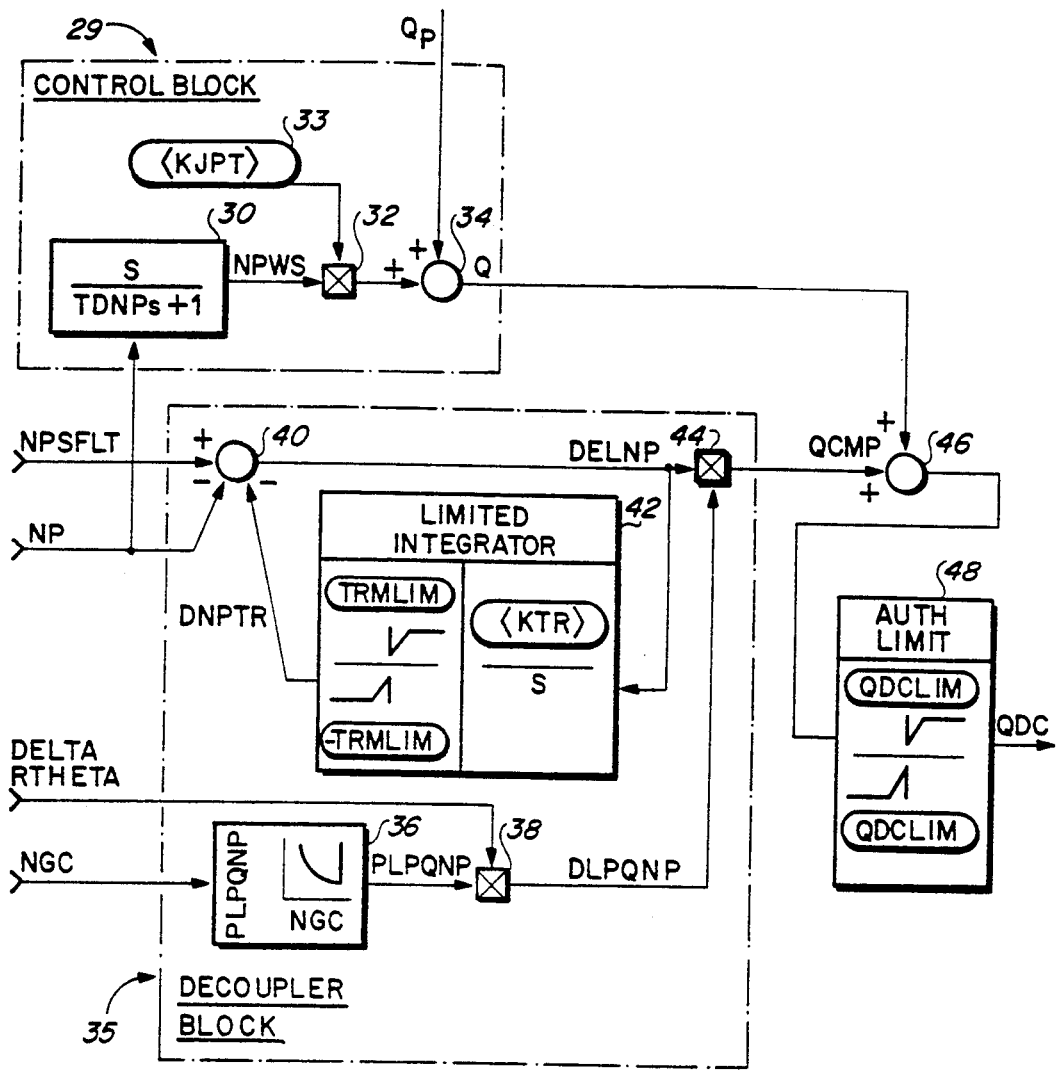
FIG. 3 is a logic diagram of a torque loop decoupler according to the present invention.

Referring now to FIG. 3, the torque loop decoupler 18 includes a control block 29, which controls engine torque to the turbine torque. The turbine torque Q is derived from the equation $$Q = (KJPT \cdot NPWS + QP)$$

where term QP is indicative of the torque measured at the propeller, the term KJPT is the inertia of the propeller, and the term NPWS is the derivative of propeller speed with respect to time. Torque can be measured at the propeller of the engine 12 by such well known means as phase-shift torque sensing. Thus, the signal indicating measured torque QP comprises a torque Q contributed by the propeller of the engine 12. A signal indicating the derivative NPWS is calculated by a differentiator 30 as a function of propeller speed NP. Propeller speed NP can be measured by such well known means as speed monopoles. To derive the signal indicating turbine torque Q, a first multiplier 32 multiplies a signal indicating the propeller inertia term KJPT by a signal indicating the first derivative NPWS. The inertia term KJPT is an apriori value that is stored in electronic memory 33. The output of the first multiplier 32, which is a signal indicating torque contributed by the propeller, is added to the signal indicating measured torque QP by a first adder 34. An output of the first adder 34 provides the signal indicating turbine torque Q.

A decoupler block 35 provides a compensation signal QCMP, which compensates for changes in turbine torque Q due to small, rapid changes in engine speed. The compensation signal QCMP is derived from the partial derivative DLPQNP of turbine torque with respect to propeller speed times the change in propeller speed. The partial derivative DLPQNP is a function of gas generator speed NGC. Each engine has its own curve of the partial derivative DLPQNP versus gas generator speed. For a particular engine, the curve is derived from engine tests and programmed into a function generator 36. A one-dimensional function generator is well known to those skilled in the art. During flight of the aircraft 10, a signal indicating gas generator speed NGC is supplied to one input of the function generator 36. In response to this signal, the function generator 36 outputs a signal indicating the partial derivative PLPQNP. The signal indicating partial derivative PLPQNP is adjusted for temperature and altitude by a second multiplier 38, which multiplies the signal indicating partial derivative PLPQNP by signals indicating the temperature RTHETA and the altitude DELTA. Temperature RTHETA is calculated as the ratio of ambient temperature (in degrees Rankine) to temperature for a standard day (519 degrees Rankine). Altitude DELTA is calculated as a ratio of ambient pressure (in psia) over pressure at sea level (14.696 psia). This adjustment is desirable because the characteristics of an engine change as a function of altitude and temperature. The output of the second multiplier 38 provides the signal indicating the partial derivative DLPQNP of torque with respect to propeller speed.

A subtracter 40 calculates a signal DELNP indicating change in propeller speed by taking the difference of the commanded speed NPSFLT and the signal indicating measured propeller speed NP. One output of the second subtracter 40 is supplied to a limited integrator 42, which generates a signal DNPTR indicating gradual changes in engine speed. Such changes can occur when the aircraft 10 slowly transitions from climb to cruise. The limited integrator 42 outputs the steady-state component of the signal DELNP indicating rapid changes in engine speed. Thus, the limited integrator 42 behaves as a low pass filter. Terms KTR and TRMLIM indicate gain and rate limit. The limited integrator 42 drives the signal DELNP to zero. An output of the limited integrator 42 is supplied to a subtrahend input of the subtracter 40, which removes large changes in speed from the signal DELNP. Thus, the signal DELNP only reflects only small, rapid changes in engine speed.

A third multiplier 44 multiplies together the signal DELNP and the signal indicating the partial derivative DLPQNP of torque with respect to speed. Thus, the output of the third multiplier 44 provides the compensation signal QCMP, which indicates the torque that results from small, rapid changes in engine speed.

A second adder 46 adds the compensation signal QCMP to the signal indicating turbine torque Q. An output signal of the fourth adder 46 is limited to a value QDCLIM, by an authority limiter 48. The output of the authority limiter 48 provides the signal indicating decoupled torque QDC. The compensation signal QCMP keeps the signal indicating decoupled torque QDC at a constant value for small, rapid changes in engine speed. When a disturbance causes an increase in engine speed, the speed loop causes the blade angle to be increased, thereby reducing engine speed and increasing engine torque. Since propeller speed NP is greater than the speed command NPSFLT for a short duration, the signal DELNP is negative. When signal QCMP is added to the signal indicating turbine torque Q, which is increasing, the net result at the decoupled torque QDC is zero. Thus, the torque loop is decoupled from the speed loop. When a disturbance causes an decrease in engine speed, the speed loop causes the blade angle to be decreased, thereby increasing engine speed and decreasing engine torque. Since propeller speed NP is less than the speed command NPSFLT for a short duration, the signal DELNP is positive. When signal QCMP is added to the signal indicating turbine torque Q, which is decreasing, the net result at the decoupled torque QDC is zero. Once again, the torque loop is decoupled from the speed loop.

When employed in the power management system 20 depicted in FIG. 2, the torque loop decoupler 18 is most conveniently realized through software. The power management system 20 is essentially a microprocessor. Thus, the torque loop decoupler 18 can programmed into the microprocessor. The step of programming can be readily accomplished by a person skilled in the art.

Alternately, the torque loop decoupler 18 can be realized by hardware. Adders, subtracters, limiters and filters (i.e., integrators) are well known to those skilled in the art.

The torque loop decoupler is not restricted to applicants' Power Management System. It can be employed by any power management system that controls speed and torque simultaneously.

Figure 4:
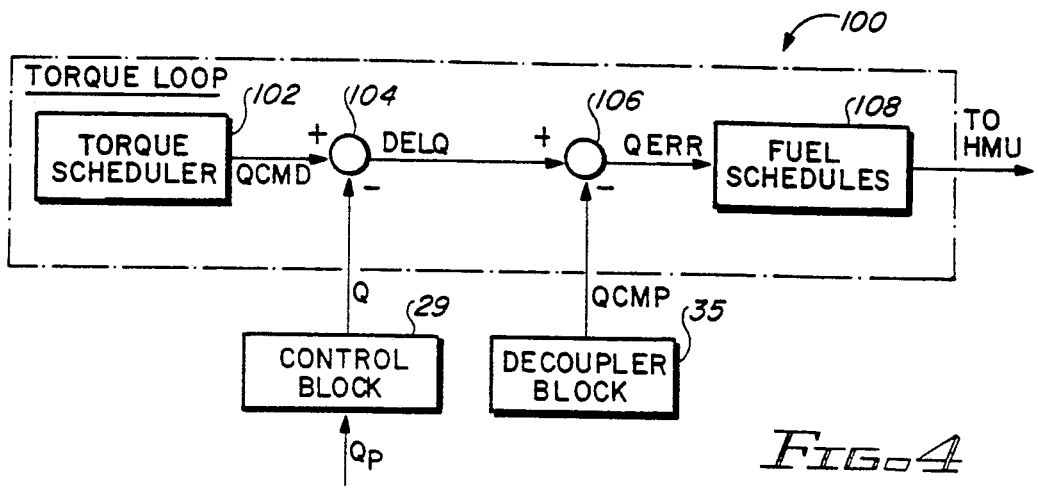
FIG. 4 is a block diagram of another of a power management system employing a torque loop decoupler according to the present invention fuel flow to a turboprop engine.

Referring now to FIG. 4, a torque loop decoupler according to the present invention is employed by a power management system having a conventional torque loop 100. The torque loop decoupler is identical to the torque loop decoupler 18 shown in FIG. 3, except that the control block 29 and decoupler block 35 have been separated. Torque commands QCMD are provided by a torque scheduler 102. The control block 29 converts a signal indicating torque QP measured at the propeller to a signal indicating torque Q at the turbine. A subtracter 104 takes the difference between the signal indicating measured torque Q and the torque command QCMD to provide a signal DELQ. An adder 106 takes the sum of the signal DELQ and the compensation signal QCMP provided by the decoupler block 35. An output of the adder 106 provides an error signal QERR, which is converted to a fuel command by fuel schedules 108. The compensation signal QCMP keeps the error signal QERR at a constant value during small, rapid changes in engine speed. The torque scheduler 102 and fuel schedules 108 are well known to those skilled in the art. If it is desirable to control to torque QP measured at the propeller torque instead of turbine torque Q, the control block 29 can be eliminated and the signal indicating torque QP can be fed directly to the subtracter 104.

It will be understood that the embodiments described herein are merely exemplary and that a person skilled in the art may make many variations and modifications without departing from the spirit and scope of the invention. All such modifications are intended to be included within the scope of the invention as defined in the appended claims.

We claim:

1. For an aircraft power management system having a speed loop which controls engine speed and a torque loop which controls engine torque, apparatus comprising:
   delta speed means for providing a delta speed signal indicative of small, rapid changes in said engine speed; compensating means, responsive to said delta speed signal, for generating a compensation signal that varies as a function of said small, rapid changes in said engine speed; and
   modifying means, responsive to said compensation signal, for operating on said torque loop such that said torque loop does not react to said small, rapid changes in said engine speed.

2. Apparatus according to claim 1, wherein said compensating means includes
   partial derivative means for providing a partial derivative signal indicating a partial derivative of said engine torque with respect to propeller speed; and
   multiplying means, responsive to said partial derivative means and said delta speed means, for multiplying together said partial derivative signal and said delta speed signal, an output of said multiplying means providing said compensation signal.

3. Apparatus according to claim 2, wherein said partial derivative means includes engine speed means for providing a signal indicative of said engine speed; and function generator means for providing said partial derivative signal in response to said engine speed signal.

4. Apparatus according to claim 3, wherein said partial derivative means further includes adjustment means, operative on an output of said partial derivative means, for adjusting said partial derivative signal for temperature and altitude.

5. Apparatus according to claim 1, wherein said delta speed means includes
   comparing means for providing an error signal indicative of the difference between said engine speed and a commanded speed; and
   low pass filter means, responsive to an output of said comparing means, for filtering out rapid changes in engine speed from said error signal, and output of said low pass filter means being fed back to an input of said comparing means, whereby said output of said comparing means provides said delta speed signal.

6. Apparatus according to claim 5, wherein said low pass filter means includes an integrator.

7. Apparatus according to claim 1, wherein said power management system controls a turboprop engine and includes means for providing a control signal indicative of torque measured at a propeller of said engine, wherein said engine torque corresponds to turbine torque, and wherein said apparatus further includes converting means for converting said control signal into an engine torque signal indicating said turbine torque, an output of said converting means being utilized by said torque loop.

8. Apparatus according to claim 7, wherein said converting means includes
   calculating means for providing a product signal indicative of the product of said propeller inertia and a derivative of propeller speed with respect to time; and
   adding means for adding said product signal to said measured torque signal, an output of said adding means providing said control signal indicating said turbine torque.

9. Apparatus according to claim 1, wherein a microprocessor comprises said delta speed means, said compensating means and said modifying means.

10. Apparatus for an aircraft power management system having a speed loop that controls engine speed and a torque loop that controls engine torque to a control signal indicating a control torque, said apparatus comprising:
    a speed measuring device for indicating said engine speed with an engine speed signal;
    delta speed means responsive to said engine speed signal for providing a delta speed signal indicative of small, rapid changes in said engine speed;
    partial derivative means for providing a partial derivative signal indicating a partial derivative of said control torque with respect to said engine speed;
    multiplying means, responsive to said partial derivative means and said delta speed means, for multiplying together said partial derivative signal and said delta speed signal and providing a compensation signal; and
    modifying means for modifying said control signal with said compensation signal such that said torque loop does not react to said small, rapid changes in engine speed.

11. An aircraft power management system comprising:
    a torque loop including torque command means for providing a torque command, measuring means for measuring propeller torque and providing a measured torque signal, and first summing means for providing an error signal indicative of the difference of said torque command and said measured torque signal;
    speed means for providing a signal indicative of small, rapid changes in engine speed;
    decoupling means, responsive to said signal provided by said speed means, for providing a compensation signal that is inversely proportional to changes in said engine speed; and
    modifying means, responsive to said first summing means and said decoupling means, for modifying said error signal with said compensation signal.

12. Apparatus according to claim 11, wherein said speed means includes second summing means for providing a delta speed signal that indicates the difference between said engine speed and a commanded speed; and low pass filter means, responsive to said delta speed signal, for filtering out rapid changes in said engine speed, an output of said low pass filter means being fed back to an input of said second summing means, whereby an output of said second summing means provides said signal indicative of said small, rapid changes in said engine speed.

13. Apparatus according to claim 12, wherein said low pass filter means includes an integrator.

14. Apparatus according to claim 13, wherein said decoupling means includes partial derivative means for providing a partial derivative signal indicating a partial derivative of said control torque with respect to said engine speed; and multiplying means, responsive to said partial derivative means and said speed means, for multiplying together said partial derivative signal and said signal indicative of small, rapid change in said engine speed, an output of said multiplying means providing said compensation signal.

15. Apparatus according to claim 14, wherein said partial derivative means includes function generator means for providing said partial derivative signal in response to a signal indicative of gas generator speed.

16. Apparatus according to claim 15, wherein said partial derivative means further includes adjusting means operative on an output of said function generator means, for adjusting said partial derivative signal for temperature and altitude.

17. Apparatus according to claim 11, further including torque conversion means for converting said measured torque signal to a turbine torque signal, said torque conversion means including calculating means for providing a product signal indicative of the product of propeller inertia and a derivative of said engine speed with respect to time; and second summing means, operative on an output of said measuring means, for adding said product signal to said measured torque signal, whereby said turbine torque signal is providing to said first summing means.

18. A power management system for an aircraft engine, comprising:

speed feedback means for providing a speed feedback signal which indicates engine speed;

torque feedback means for providing a torque feedback signal which indicates engine torque;

command means for generating torque and speed commands;

a speed loop responsive to said speed command and said speed feedback signal for controlling said engine to engine speed;

a torque loop responsive to said torque command and said torque feedback signal for generating a torque error signal and controlling said engine to engine torque;

delta speed means for providing a delta speed signal indicative of small, rapid changes in said engine speed;

compensating means, responsive to said delta speed signal, for generating a torque compensation signal that varies as a function of small, rapid changes in said engine speed; and modifying means, responsive to said compensating means for modifying said torque error signal with said torque compensation signal such that said torque loop is relatively undisturbed by small, rapid changes in said engine speed.

* * * * *